United States Patent [19]

Reder et al.

[11] Patent Number: 4,660,666
[45] Date of Patent: Apr. 28, 1987

[54] STRAIN GAUGE SCALE FOR WEIGHING FISH

[75] Inventors: Lawrence H. Reder, St. Louis Park, Minn.; Robert W. Junghans, 4860 W. 39th St., #217, St. Louis Park, Minn. 55416

[73] Assignee: Robert W. Junghans

[21] Appl. No.: 646,238

[22] Filed: Aug. 31, 1984

[51] Int. Cl.⁴ .................. G01G 3/14; G01G 19/00; G01G 19/56; G01G 21/00
[52] U.S. Cl. ................... 177/148; 177/126; 177/211; 177/245
[58] Field of Search .............. 177/126, 127, 148, 211, 177/245, 229, 164

[56] References Cited

U.S. PATENT DOCUMENTS

| | | | |
|---|---|---|---|
| 960,535 | 6/1910 | Gilfillan | 177/127 |
| 1,174,526 | 3/1916 | Stoddart | 177/127 |
| 2,603,474 | 7/1952 | Mondolf et al. | 177/126 X |
| 2,761,670 | 9/1956 | Fouretier | 177/211 |
| 3,077,737 | 2/1963 | Nakayama | 177/245 |
| 3,797,595 | 3/1974 | Yin et al. | 177/164 |
| 4,115,715 | 9/1978 | Müller | 310/67 X |
| 4,217,508 | 8/1980 | Uzuko | 310/67 |
| 4,249,624 | 2/1981 | Kuhnle | 177/229 X |
| 4,286,184 | 8/1981 | Kögler et al. | 310/67 |
| 4,311,933 | 1/1982 | Riggs et al. | 310/67 X |
| 4,451,817 | 5/1984 | Zulliger | 177/211 X |

FOREIGN PATENT DOCUMENTS

| | | | |
|---|---|---|---|
| 278904 | 10/1914 | Fed. Rep. of Germany | 177/211 |
| 1130611 | 5/1962 | Fed. Rep. of Germany | 177/211 |

OTHER PUBLICATIONS

Lockery, Harry E., "Low Profile Weighing Transducers", *Weighing and Measurement*, Jan.-Feb. 1984, pp. 13-17.

Hill, W. Ryland, *Electronics in Engineering*, 2nd Edition, McGraw-Hill, pp. 292-294.

*Primary Examiner*—E. A. Goldberg
*Assistant Examiner*—Patrick W. Foster

[57] ABSTRACT

A scale particularly for weighing fish which is portable and normally hand held and which includes a strain gauge for sensing the weight of a fish and the strain gauge providing a leg of a Wheatstone Bridge to provide the measuring of the strain placed upon a member to which the fish is attached. The unit includes battery sources for the required power and includes an LED display unit for reading of the weight of the fish. A zero set may be incorporated in the circuitry or a reset to zero reading may be provided. The unit provides a portable, accurate scale for weighing of fish and the unit may also include selective sensing circuitry for reading of other inputs such as temperature of water.

2 Claims, 6 Drawing Figures

STRAIN GAUGE SCALE FOR WEIGHING FISH

FIELD OF THE INVENTION

This invention relates generally to weighing scales, more particularly to small, portable scales for weighing fish and still more particularly to a portable scale for the weighing of fish which includes a strain gauge sensing unit and an LED display for scale readout.

SHORT SUMMARY OF THE INVENTION

A portable fish weighing scale which includes a housing for retaining the various components for sensing of and translation of the weight of the fish to a visual display. In the preferred form of the invention a strain gauge is selectively provided on various beam structures to which a fish attachment device such as a hook is secured. A hook device has one end positively fixed or is connected to the beam structure with the other end, hooking end, arranged to receive a fish. The strain gauge measures the strain exerted directly upon the shank or body of the hook or, alternatively, the beam structure, by the weight of the fish with the strain gauge provided as an element or one leg of a Wheatstone Bridge with reading thereof being directed to a conversion circuit for actuation of an LED display.

The circuitry of the scale includes means for zero set and may also include interconnect means for the insertion of other sensing elements such as a temperature sensing probe to measure water temperature and possibly a pH sensing probe. This circuitry is arranged such that the insertion of a selected unit would either remove the weighing section from the operative circuit or would provide for operational selectivity.

The entire unit is preferable provided in a weather resistant, portable carrying case.

BACKGROUND AND OBJECTS OF THE INVENTION

The applicant is well aware of various scales to weigh fish. Applicant is equally aware of portable and hand held scales to weigh fish. Similarly, the applicant is well aware that the only fish weighing scales, portable in nature, are of the spring variety and further, he is aware of no scales which include an LED visual readout and is only aware of direct and dial readout scales, the latter normally not being used in portable form. Normally, these scales are highly inaccurate and have been the cause of many discussions. Accuracy in fishing contests and for record import are important to fishermen. Primarily for these reasons, the applicant has provided the scale described herein.

The prior art is relatively limited as to the application of and usage of strain gauges for weighing articles and is absent of any showing of a strain gauge in a portable scale.

Prior art that the applicant was able to discover which includes the use of strain gauges and is applicable for weight measurement includes several United States Patents. These patents include references to load cell devices which, for practical and applied purposes, would include strain gauges. Such Pats. include: No. 4,146,100 Jacobson et l; 4,061,198 to Caldicott; 3,559,059 to Martin et al; 2,955,811 to Jonas et al and 2,467,752 to Howe.

These patents all illustrate various means employing strain gauges or load cells in various applications but, in final effect, none of them illustrate a unit which acts simply as a scale. For example, even though a scale is illustrated in the Howe patent, the loading of the unit is to provide an incremental reading of a piece of material to which the strain gauge is attached and this is commonly thought to be the use of a strain gauge. Plainly stated, applicant's use is directly opposed to normal strain gauge usage, such usage being to determine a final effect placed upon a piece of material by a known weight as compared to applicant's use which is to determine the weight of an article by knowing the parameters of the gauge and applying the unknown weight thereto.

It is therefore an object of the applicant's invention to provide a portable, highly accurate scale for weighing of articles such as fish.

It is a further object of the applicant's invention to provide a portable, accurate scale for the weighing of fish and similar articles which is weather resistant and operable under adverse conditions.

It is still a further object of the applicant's invention to provide a portable scale for the weighing of fish and similar articles which incorporates a strain gauge to measure the weigth ot the articles and which incorporates appropriate electronic circuitry to convert the measurement of strain placed upon the gauge by the weight of the articles and convert the same to a visual readout.

It is yet a further object of the applicant's invention to provide an accurate, portable scale for the weighing of fish and similar articles which provides means for attaching and connecting other sensing units thereto which are selectively arranged for incorporation into the circuitry of the unit for testing water conditions.

These and other objects and advantages of the applicant's unit will more fully appear from a consideration of the accompanying drawings made in association with the accompanying description of a preferred form of the invention.

DESCRIPTION OF A PREFERRED FORM OF THE INVENTION

Figure 1:
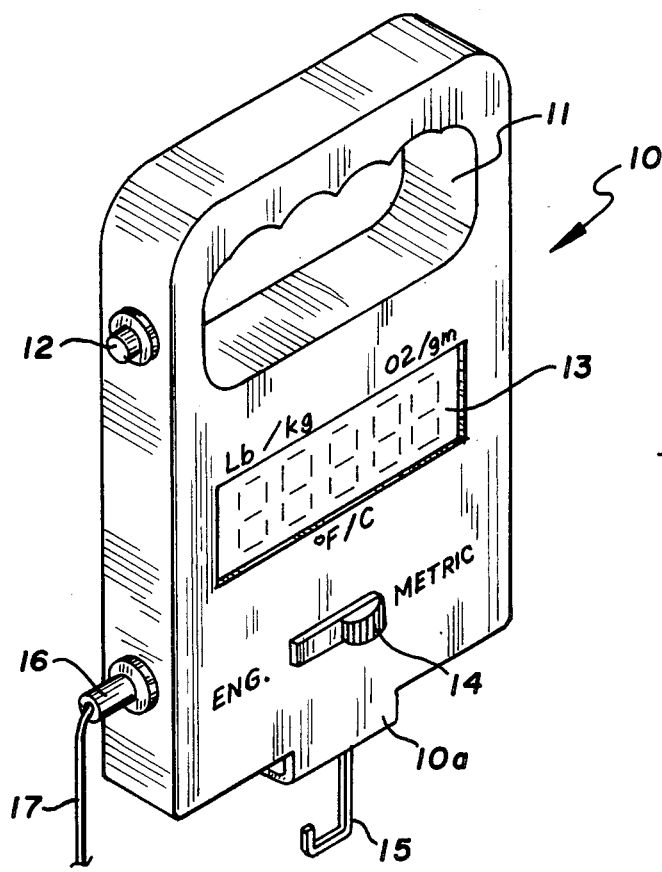
FIG. 1 is a perspective view of a weighing scale embodying the concepts of the applicant's invention and illustrating an additional testing device attached thereto.

In accordance with the accompanying drawings, the fish weighing scale embodying the concepts of the applicant's invention is illustrated in a particular form in FIG. 1 and is designated in its entirety 10. It should be obvious that the unit illustrated is only suggestive of a shape and the esthetic consideration of an actual unit are not provided. Unit 10 provides a housing for the workings of the scale and other sensing equipment and includes a hand hold portion 11, a switch 12, which switch may include operative control for zero opperation of the unit, a readout area 13, a readout control switch 14 for selection of English or Metric reading, a hook 15 for attachment of the article to be weighed and a plug-in jack 16 and sensing element 17. The plug-in 16 and sensing element are adjuncts to the main concept of the invention but are important thereto as providing logical use for the unit.

It may be stated then that the housing unit 10 provides a weather tight or weather resistant unit to house the various operative portions of the device and as such would be constructed of materials which have weather resistant qualities.

With the applicant's concepts, a scale, having no visibly moveable parts is provided and those parts that could possibly be termed as moveable are arranged within the housing 10 so as to be weather protected.

Figure 2:
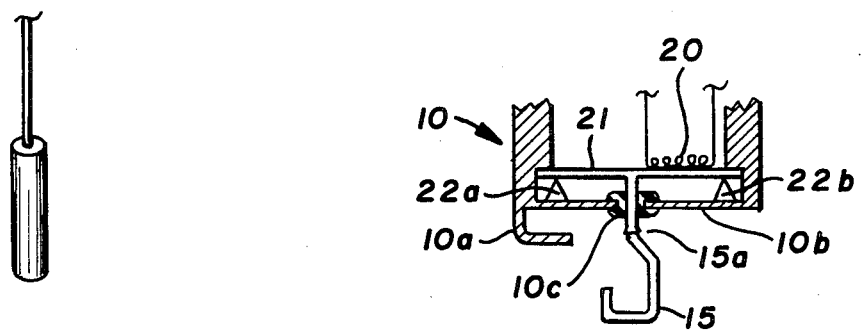
FIG. 2 is a section of the unit illustrating a first method for mounting of a hook for attachment of an article such as a fish to provide a proper and accurate arrangement for the mounting of a Wheatstone Bridge.
Figure 4:
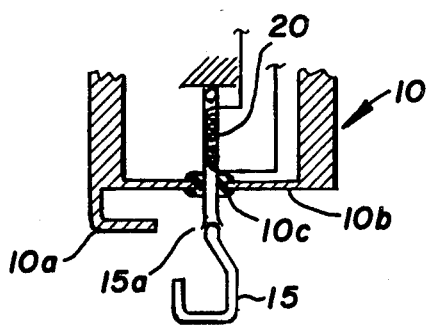
FIG. 4 is yet another alternative mount for the hook and Wheatstone Bridge connection.
Figure 3:
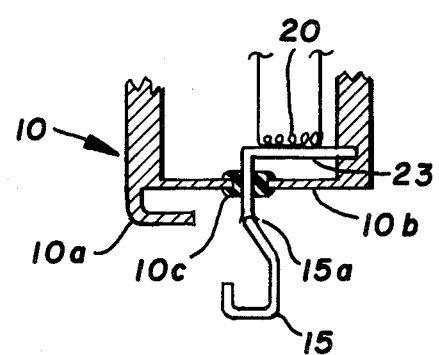
FIG. 3 is a section comparative to FIG. 2 llustrating another method for mounting of the hook and Wheatstone Bridge.

Three different mountings for the hook or article attachment device 15 are illustrated in FIGS. 2, 3 and 4. As also illustrated, the shank of the hook 15 is provided with a ball or universal joint 15a to permit the same to be shifted from weighing position to storage position and a clip element 10a is provided on the lower surface 10b of housing 10 such that the hook 15 may be slid between the leg of the clip 10a and the housing surface 10b. For accurate weighing, the ball joint must transfer the entire load through the hook 15 to the location of the strain gauge which measures the effect of the weight on the hook.

As illustrated in FIGS. 2, 3 and 4, the mountings for the hook 15 and associated strain gauge 20 include a simple beam mount of FIG. 2, a cantilever mount of FIG. 3 and a straight linear mount of FIG. 4. In FIG. 2, the hook 15 is provided in the center of the support beam 21, which beam 21 is provided on knife edge mounts 22a, 22b. Obviously this knife edge mounting could be modified to provide a similarly positive clamp means for the ends of beam 21. In FIG. 3, a beam portion 23 is rigidly attached to a side wall of the housing unit 10 and hook 15 is secured integrally to the end thereof thus providing a cantilever beam arrangement. In FIG. 4, no beam is provided and rather, hook 15 is rigidly attached to a portion of the housing. In this instance, the strain gauge 20 is provided on the beam or directly on the hook to measure the strain placed upon the particularly sensed area due to fish load. Also, as illustrated, a hook passing seal 10c is provided in the lower surface of unit 10 and the shank of the hook 15 passes therethrough so as to provide a static seal against weather. Seal 10c will not impede the transfer of weight to the measure portion of the beam or hook.

The principle of mounting the hook and the associated strain gauge is to provide accurate transfer of the weight of the fish to the sensed portion of the hook or combination of beam and hook.

Figure 5:
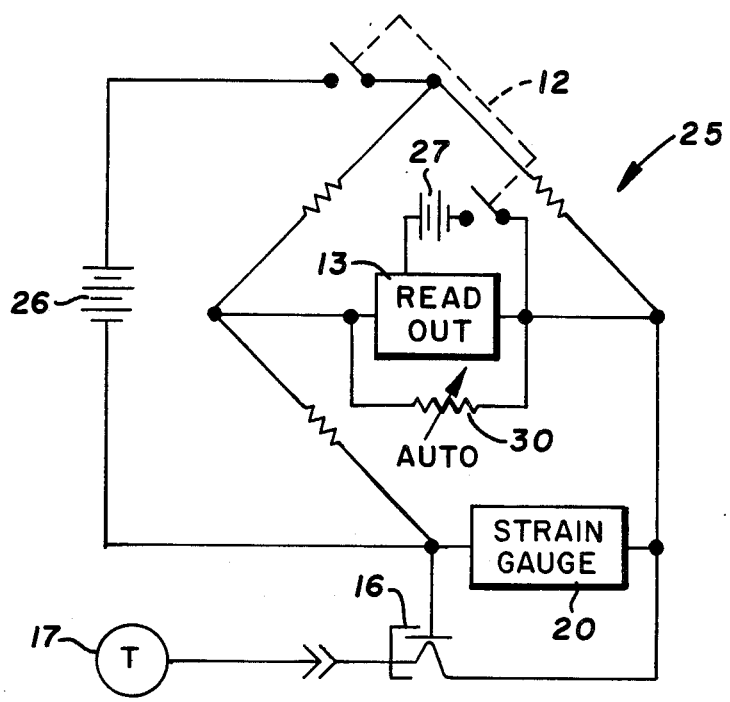
FIG. 5 is a simplified schematic drawing of the electronic circuitry included in the scale; and, FIG. 6 is a block diagram illustrating the various components employed to provide for the operation of the unit.

As illustrated in FIG. 5, a schematic electronic circuit for the operation of the unit, the strain gauge 20 forms one leg of a Wheatstone Bridge. The operation of a Wheatstone bridge is well known in the art and in this instance the strain gauge provides the unknown or resistance to be measured. The resistance of the strain gauge varies in accordance with the load placed thereon and this load is the weight of the fish. In this Figure, the Wheatstone Bridge is designated 25, a primary power source is designated 26, a secondary power source for power delivery to a digital converter 28 and the LED readout 13 is designated 27. A variable resistor 30 is illustrated across the readout 13 and this resistor may be modified such that manual zeroing for readout or automatic zeroing may be be utilized. It should also be obvious that the power of secondary source 27 may be delivered from the primary source 26 if desired. Such variations are a question of sizing and desire.

Figure 6:
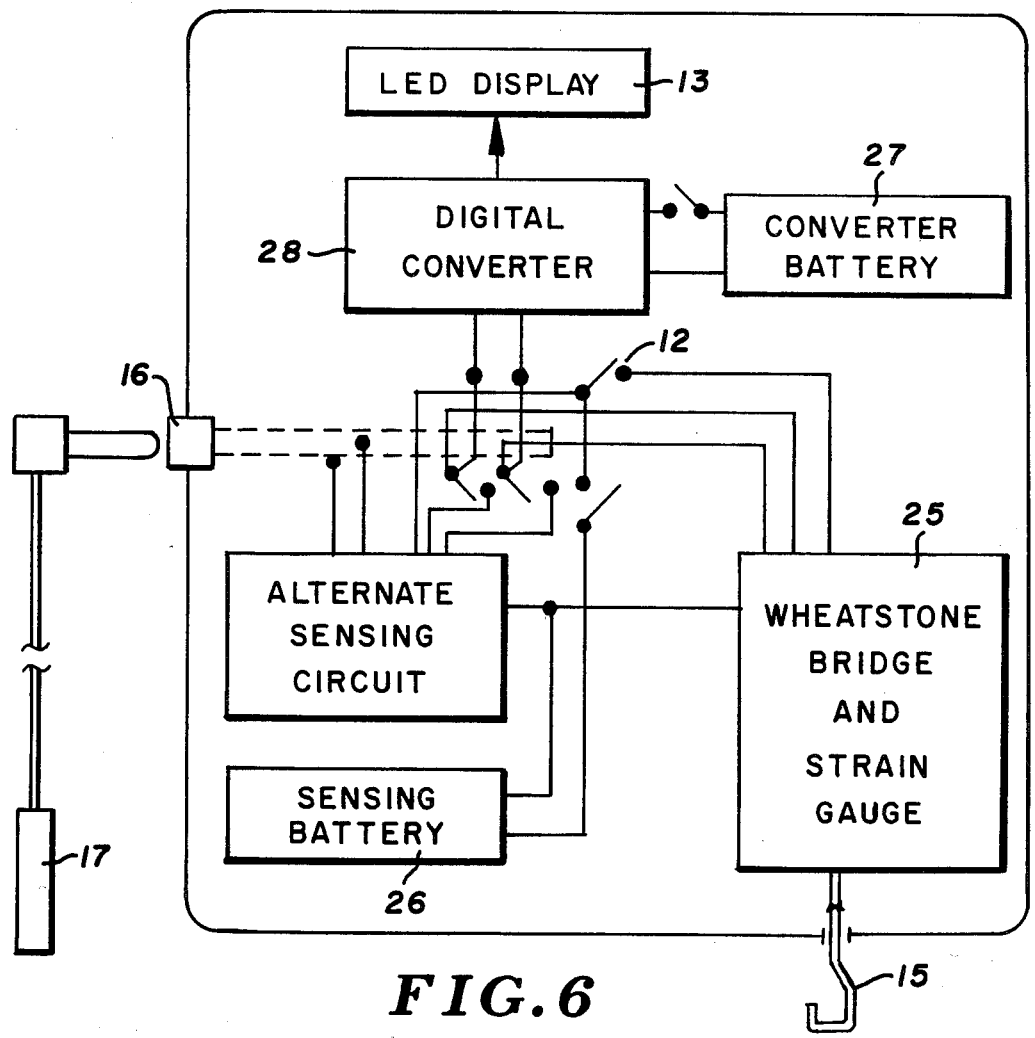

As illustrated in FIGS. 5 and 6, an alternate sensing probe 17 may be utilized to measure other important water qualities. Such probes would include temperature probes and pH measuring probes. Both of these water qualities are important to fishermen and many fishermen rely on such measurements to determine fishing quality of the water. The selection of either such probe will require a coordinating circuit for conversion of the gathered information and translation thereof into readout, in this case, digital form. It is not believed necessary to discuss the particular circuitry involved in such functions as the same is commercially and readily available. The connective circuitry would allow for continued plug-in operation with a switching function for use of the probe or weighing device or would provide for automatic lockout of the weighing circuitry upon insertion of the probe into the accepting socket 16.

The use of the unit should be obvious in that a portable unit, hand holdable in size is provided that is directed to the weighing of fish to provide an accurate measurement of the fish. Such accuracy is becoming more and more important with the recent increase in fishing and fishing contest interest. Present scales may be accurate, but output readings by individuals may vary substantially and verification of weights is demanded. Applicant's device eliminates these problems.

Accuracy and advantages of strain gauges are well known in the art. A strain gauge has advanced from its beginning, wire-wound, form to various sheet materials having increased sensitivity and even though the output of a strain gauge may not be linear, the readout and control circuitry for output of the Wheatstone Bridge is designed to compensate for factors to provide the desired and accurate readout of the fish being weighed.

As stated, the use of strain gauges is known in the art and this art addresses the use of load cells in determining applied forces. Applicant's concept includes the utilization of the strain gauge techniques as well as the techniques of load cell use, the same being applicable to solve the problem presented by applicant.

In the broadest sense, applicant's concept utilizes measurement of electrical or electronic variation producing elements which are responsive to weight application rather than the measurement of mechanical variation producing elements which are responsive to weight application and the concept then includes strain gauge, load cells and piezo crystals whether rotationally or linearly loaded. Each of these elements provide electrical variation in response to a mechanical force exerted thereon.

It should be obvious that the applicant has provided a unique scale, particularly designed for the weighing of fish which basically includes a hook or attachment element for the fish with a strain gauge integrally applied to the hook to receive and trasmit the forces applied thereto with electronic means to convert the physical forces of the applied load to electrical impulses which are converted to proper readout form which form has been selected as digital rather than analog form, as a matter of choice. The unit is portable and is generally impervious to weather conditions and may include other sensing devices which are selectively operable.

What is claimed is:

1. A portable scale including:
   a. a housing arranged for retaining the active elements for weighing an article;
   b. article attachment means having one end thereof secured in said housing and extending through said housing for connection of the article to be weighed;
   c. electrical transducer means cooperatively associated with said article attachment means and acting in response to the weight of an article connected to said attachment means;
   d. electrical circuit means including said electrical transducer means arranged and constructed to develop a signal in response to the input of said electrical transducer means to said circuit;
   e. a source of electrical power within said housing and included in said circuit;
   f. readout means receiving said developed signal and providing the same for visual readout; and,
   g. said circuit means including connector means for the receipt of additional signal inputs including temperature introduction means.

2. The structure set forth in claim 1 and said circuit means including connector means for the receipt of additional signal inputs including pH introduction means.

* * * * *